(12) United States Patent
Liao

(10) Patent No.: US 9,007,700 B2
(45) Date of Patent: Apr. 14, 2015

(54) THIN-TYPE WIDE-ANGLE IMAGING LENS ASSEMBLY WITH FOUR LENSES

(71) Applicant: Ability Opto-Electronics Technology Co., Ltd, Taichung County (TW)

(72) Inventor: Kuo-yu Liao, Taichung (TW)

(73) Assignee: Ability Opto-Electronics Technology Co., Ltd., Taichung County (TW)

( * ) Notice: Subject to any disclaimer, the term of this patent is extended or adjusted under 35 U.S.C. 154(b) by 21 days.

(21) Appl. No.: 13/970,872

(22) Filed: Aug. 20, 2013

(65) Prior Publication Data

US 2014/0313598 A1    Oct. 23, 2014

(30) Foreign Application Priority Data

Apr. 22, 2013    (TW) .............................. 102207275 U

(51) Int. Cl.
- *G02B 3/02* (2006.01)
- *G02B 13/18* (2006.01)
- *G02B 13/00* (2006.01)

(52) U.S. Cl.
CPC .............. *G02B 13/18* (2013.01); *G02B 13/004* (2013.01)

(58) Field of Classification Search
USPC .......................................................... 359/715
See application file for complete search history.

(56) References Cited

U.S. PATENT DOCUMENTS

2012/0327522 A1*    12/2012    Tsai et al. ..................... 359/715

\* cited by examiner

*Primary Examiner* — James Jones
(74) *Attorney, Agent, or Firm* — Ming Chow; Sinorica, LLC

(57) ABSTRACT

A thin-type wide-angle imaging lens assembly comprises a fixing diaphragm and an optical set including four lenses. An arranging order from an object side to an image side is: a first lens; a second lens; a third lens; a fourth lens; and the fixing diaphragm disposed between an object and the second lens. By the concatenation between the lenses and the adapted curvature radius, thickness/interval, refractivity, and Abbe numbers, the assembly attains a big diaphragm with ultra-wide-angle, a shorter height, and a better optical aberration.

2 Claims, 4 Drawing Sheets

THIN-TYPE WIDE-ANGLE IMAGING LENS ASSEMBLY WITH FOUR LENSES

The current application claims a foreign priority to the patent application of Taiwan No. 102207275 filed on Apr. 22, 2013.

BACKGROUND OF THE INVENTION

1. Field of the Invention

The present invention relates to a thin-type wide-angle imaging lens assembly with four lenses, in particular to a lens structure attaining a shorter height and a high resolution by curvature, interval and optical parameter between each lens.

2. Description of the Related Art

The conventional lens structure adopts an image display lens assembly which is applied to smart phone, tablet PC, cell phone, notebook, and webcam. The electronic products are developed to become lighter, thinner, shorter, and smaller and provide with higher efficiency. A video sensor of the image display lens assembly, such as Charge Coupled Device (CCD) or Complementary Metal Oxide Semiconductor (CMOS), is also developed for more pixels, so the lens structure is ceaselessly developed to be provided with compactness and higher resolution.

Therefore, the present invention is disclosed in accordance with a lens structure with multi-lens for a demand of the development of the image display lens assembly, especially to an imaging lens assembly of a lens structure with at least four lenses.

SUMMARY OF THE INVENTION

In view of the conventional lens structure that has big volume and lack of efficiency, a thin-type wide-angle imaging lens assembly with four lenses is disclosed.

It is an object of the present invention to provide a thin-type wide-angle imaging lens assembly with four lenses, which comprises a fixing diaphragm and an optical set. The optical set includes a first lens, a second lens, a third lens, and a fourth lens. An arranging order thereof from an object side to an image side is: the first lens with a positive refractive power and a convex surface directed toward the image side, and at least one surface of the first lens is aspheric; the second lens with a negative refractive power and a convex surface directed toward the image side, and at least one surface of the second lens is aspheric; the third lens having a lens with a positive refractive power and a convex surface directed toward the image side, and two surfaces of the third lens are aspheric and have at least one inflection point defined from an optical axis to an end point of the aspheric surfaces; the fourth lens with a negative refractive power, a convex surface directed toward the object side and disposed near the optical axis, and a concave surface directed toward the image side and disposed near the optical axis, and the two surfaces of the fourth lens are aspheric and have at least one inflection point defined from the optical axis to an end point of the aspheric surfaces; and the fixing diaphragm disposed between an object and the second lens.

The imaging lens assembly satisfies the following conditional expression: $0.3 < f/TL < 0.8$. The TL is defined as a distance from a top point of the object side of the first lens to an imaging surface side. The f is a focal length of the entire assembly.

The imaging lens assembly satisfies the following conditional expression: $0.6 < TL/Dg < 1.2$. The TL is defined as the distance from a top point of the object side of the first lens to the imaging surface side. The Dg is defined as a length diagonal of an effective pixel area of an electronic sensitization unit.

A shape of the aspheric surface of the imaging lens assembly satisfies a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

The z is defined as a position value about a location at a height of h along a direction of the optical axis referring to a surface top point. The k is defined as a conic constant. The c is defined as a radius of a curvature. The A, B, C, D, E, G, etc. are defined as high-order aspheric surface coefficients.

The present invention is characterized in that a lens structure attains a big diaphragm with ultra-wide-angle, a shorter height, and a high resolution by curvature, interval, and optical parameter between each lens.

DETAILED DESCRIPTION OF THE PREFERRED EMBODIMENTS

Figure 1:
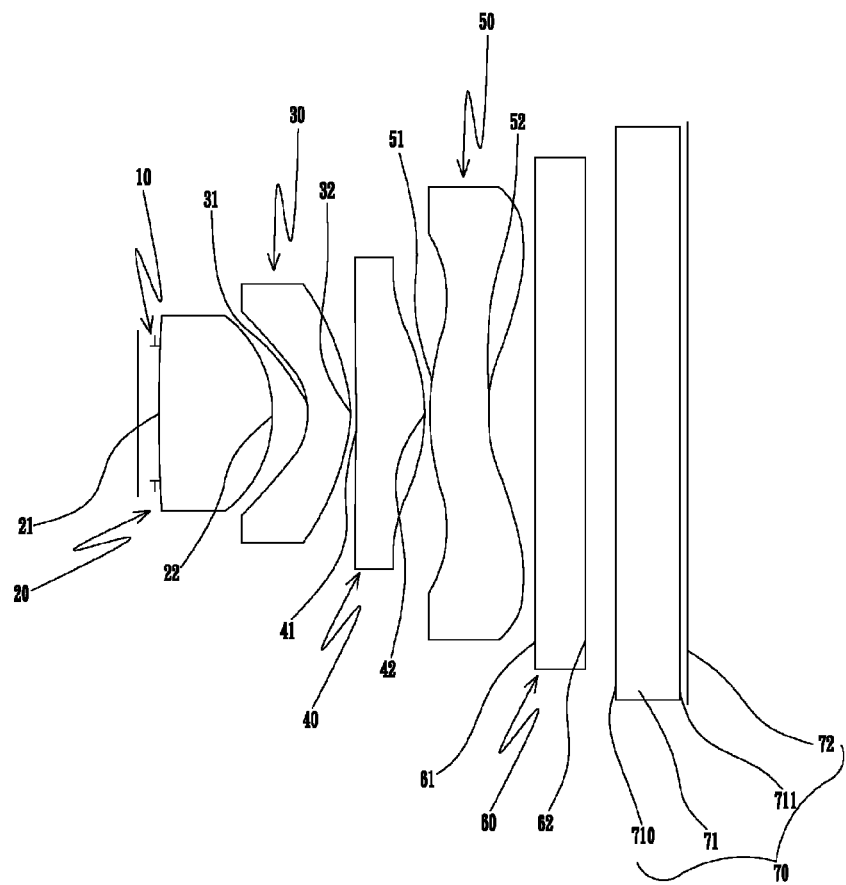
FIG. 1 is a schematic view showing an optical structure of a preferred embodiment of the present invention.

Before describing in detail, it should note that the like elements are denoted by the similar reference numerals throughout disclosure.

The present invention provides an imaging lens structure, in particular to a lens structure attaining a big diaphragm with ultra-wide-angle, a shorter height, and a high resolution by a curvature, an interval, and an optical parameter between each lens.

Referring to FIG. 1, a schematic view of an optical structure of a thin-type wide-angle imaging lens assembly with four lenses is shown. The structure of the imaging lens comprises a fixing diaphragm 10 and an optical set. The optical set includes a first lens 20, a second lens 30, a third lens 40, and a fourth lens 50. An arranging order thereof from an object side to an image side is: the first lens 20 having at least one aspheric surface with a positive refractive power and a concave surface directed toward the image side; the second lens 30 having at least one aspheric surface with a negative refractive power and a convex surface directed toward the image side; the third lens 40 having two aspheric surfaces with a positive refractive power, a convex surface directed toward the image side, and at least one inflection point defined from an optical axis to an end point of the aspheric surfaces; the fourth lens 50 having two aspheric surfaces with a negative refractive power, a convex surface directed toward the object side and disposed near an optical axis, a concave surface directed toward the image side and disposed near the optical axis, and at least one inflection point defined from the optical axis to an end point of the aspheric surfaces; the fixing diaphragm 10 disposed between an object and the second lens; a filter unit 60 filtering light with specific wave length and being adopted by an infrared stopping filter unit applied to a visible light image; and an image sensor 70 (an imaging surface side) used for receiving a digital signal transformed by the infrared invisible light image of the filter unit. The image sensor 70 includes a flat protection lens 71 and a video sensor 72. The video sensor 72 is preferably adopted by Charge Coupled Device (CCD) or Complementary Metal Oxide Semiconductor (CMOS).

The imaging lens assembly satisfies the following conditional expression: 0.3<f/TL<0.8. The TL is defined as a distance from a top point of the object side of the first lens to the imaging surface side. The f is defined as a focal length of the entire lens assembly.

The imaging lens assembly satisfies the following conditional expression: 0.6<TL/Dg<1.2. The TL is defined as the distance from the top point of the object side of the first lens to the imaging surface side. The Dg is defined as a length diagonal of an effective pixel area of an electronic sensitization unit.

The first lens 20 includes a first surface 21 facing an object side and a second surface 22 facing the imaging surface side. The first surface 21 is defined as a convex surface opposite to the object side. The second surface 22 is defined as a convex surface opposite to the imaging surface side. The second lens 30 includes a third surface 31 facing the object side and a fourth surface 32 facing the imaging surface side. The third surface 31 is defined as a concave surface opposite to the object side. The fourth surface 32 is defined as a convex surface opposite to the imaging surface side. The third lens 40 includes a fifth surface 41 facing the object side and a sixth surface 42 facing the imaging surface side. The fifth surface 41 is defined as a concave surface opposite to the object side. The sixth surface 42 is defined as a convex surface opposite to the imaging surface side. The fourth lens 50 includes a seventh surface 51 facing the object side and a eighth surface 52 facing the imaging surface side. The seventh surface 51 is defined as a convex surface opposite to the object side. The eighth surface 52 is defined as a concave surface opposite to the imaging surface side. At least one surface of the first lens 20 and the second lens 30 are aspheric, and two surfaces of the third lens 40 and the fourth lens 50 are aspheric, thereby correcting the spherical aberration and the image aberration for being provided with a characteristic of low common difference sensitivity.

A shape of the aspheric surface of the imaging lens assembly satisfies a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

The z is defined as a position value about a location at a height of h along a direction of the optical axis referring to a surface top point. The k is defined as a conic constant. The c is defined as a reciprocal of a radius of a curvature. The A, B, C, D, E, G, etc. are defined as high-order aspheric surface coefficients.

In an ultra-wide-angle micro-optical image capturing device of the present invention, the fixing diaphragm 10 is disposed between the object and the first lens 20 for getting an incident beam. The first lens 20 and the third lens 40 are adopted by lenses with positive refractive power, and the second lens 30, the fourth lens 50 are adopted by lenses with negative refractive power. The second lens 30 is concavely defined toward the object side for assembling the external incident beam with ultra-wide-angle so as to keep the beam on the fourth surface 32 of the second lens 30, thereby presenting a function of the aspheric surface, correcting the aberration, reducing the common difference sensitivity, and rendering the device have ultra-wide-angle with an image-capture angle over 85°. The fifth surface 41 defined on the third lens 40 as a concave surface opposite to the object side is then expanded. The sixth surface 42 is defined as a lens with positive refractive power and a convex surface opposite to the imaging surface side. The fourth lens 50 radiates via the seventh surface 51 concavely defined toward the imaging surface side, so that the beam is able to be spread on the eighth surface 52 of the fourth lens 50 with a larger dimension. That is to say, the incident beam is expanded by the fifth surface 41 for being spread on the eighth surface 52 with a larger dimension. The first lens 20 is defined as a meniscus shape for presenting the function of aspheric surface, correcting the aberration, and reducing common difference sensitivity.

The aspheric surface not only corrects the spherical aberration and the image aberration but also reduces the full length of the lens optical system. The first lens 20, the second lens 30, the third lens 40, and the fourth lens 50 are preferably adopted by plastic, which is conducive to eliminate the aberration and reduce the weight of the lens. The entire optical system consists of four plastic lenses and benefits a mass production. The system also provides with the low common difference sensitivity to meet the requirement of mass production. The filter unit 60 used for filtering the infrared invisible light and allowing the visible light forms an ultra-wide-angle micro-optical image capturing device capable of capturing the sight that people see.

By the concatenation between the above-mentioned surfaces of lenses and the adapted curvature radius, thickness/interval, refractivity, and Abbe numbers, the assembly attains a big diaphragm with ultra-wide-angle, a shorter height, and a better optical aberration.

Due to the above-mentioned technique of the present invention, it is able to be practiced in accordance with the following values:

| Basic lens data of the preferred embodiment | | | | | |
|---|---|---|---|---|---|
| Surfaces | | Curvature radius (Radius) | Thickness/Interval (Thickness) | Refractivity (Nd) | Abbe number (Vd) |
| Fixing diaphragm 10 | | ∞ | 0.02 | | |
| First lens 20 | First surface 21 | 2.44 | 0.69 | 1.534611 | 56.072163 |
| | Second surface 22 | −0.82 | 0.22 | | |
| Second lens 30 | Third surface 31 | −0.36 | 0.26 | 1.635500 | 23.891420 |
| | Fourth surface 32 | −0.84 | 0.03 | | |
| Third lens 40 | Fifth surface 41 | −16.61 | 0.42 | 1.534611 | 56.072163 |
| | Sixth surface 42 | −1.03 | 0.03 | | |
| Fourth lens 50 | Seventh surface 51 | 1.16 | 0.36 | 1.534611 | 56.072163 |
| | Eighth surface 52 | 0.91 | 0.29 | | |

-continued

Basic lens data of the preferred embodiment

| | Surfaces | Curvature radius (Radius) | Thickness/Interval (Thickness) | Refractivity (Nd) | Abbe number (Vd) |
|---|---|---|---|---|---|
| Filter unit 60 | Eleventh surface 61 | ∞ | 0.30 | 1.516798 | 64.198258 |
| | Twelfth surface 62 | ∞ | 0.19 | | |
| Flat protection lens 71 | Thirteenth surface 710 | ∞ | 0.40 | 1.516798 | 64.198258 |
| | Fourteenth surface 711 | ∞ | 0.05 | | |

The filter unit 60 has a thickness of 0.3 mm and is adopted by an infrared light stopping filter unit. A wave length of the light passing therethrough is 450~650 mm. A thickness of the flat protection lens 51 is 0.4 mm.

The values of quadratic surface coefficient of the aspheric surface of the preferred embodiment are listed as follows:

The first surface 21 ($k=-169.64$)
A: 0.931087
B: −8.667972
C: 25.136997
D: 137.26631
E: −1528.761
F: 3698.4235
G: 0.000000

The second surface 22 ($k=-0.97$):
A: −0.505617
B: 0.479675
C: −1.156323
D: −4.509833
E: 2.666640
F: 31.619287
G: 0.000000

The third surface 31 ($k=-0.86$):
A: 0.881675
B: 1.937428
C: −4.159731
D: −19.405002
E: 100.06543
F: −104.71738
G: 0.000000

The fourth surface 32 ($k=-0.77$)
A: 0.485844
B: −0.208825
C: −1.085958
D: 1.257003
E: 1.216946
F: −1.760795
G: 0.000000

The fifth surface 41 ($k=-10.21$):
A: 0.258347
B: −0.426799
C: 0.2009065
D: −0.274325
E: 0.723298
F: −0.557023
G: 0.000000

The sixth surface 42 ($k=-0.96$):
A: 0.176228
B: 0.505954
C: −0.791617
D: 0.299679
E: 0.368235
F: −0.254083

G: 0.000000

The seventh surface 51 ($k=-7.79$):
A: −0.014725
B: −0.573535
C: 0.680090
D: −0.243706
E: −0.142218
F: 0.118315
G: −0.016911

The eighth surface 52 ($k=-0.81$)
A: −0.545764
B: 0.265768
C: −0.071942
D: −0.004983
E: −0.005165
F: 0.007965
G: −0.002099

According to the above-mentioned values, the related exponent of performance of the micro-image capturing lens is: $f=1.83$ mm; $TL=3.37$ mm; $f/TL=0.54$; $Dg=3.58$ mm; $TL/Dg=0.94$.

Figure 2:
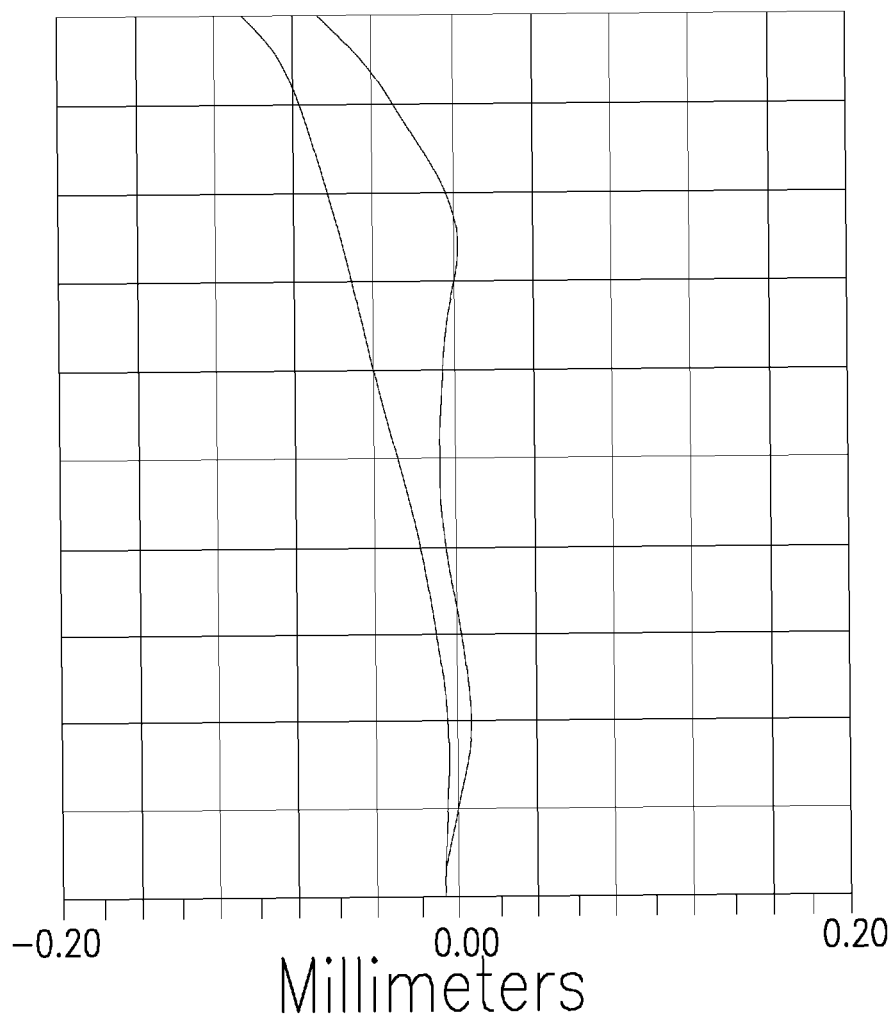
FIG. 2 is a schematic view showing an astigmatic aberration of the preferred embodiment of the present invention.
Figure 3:
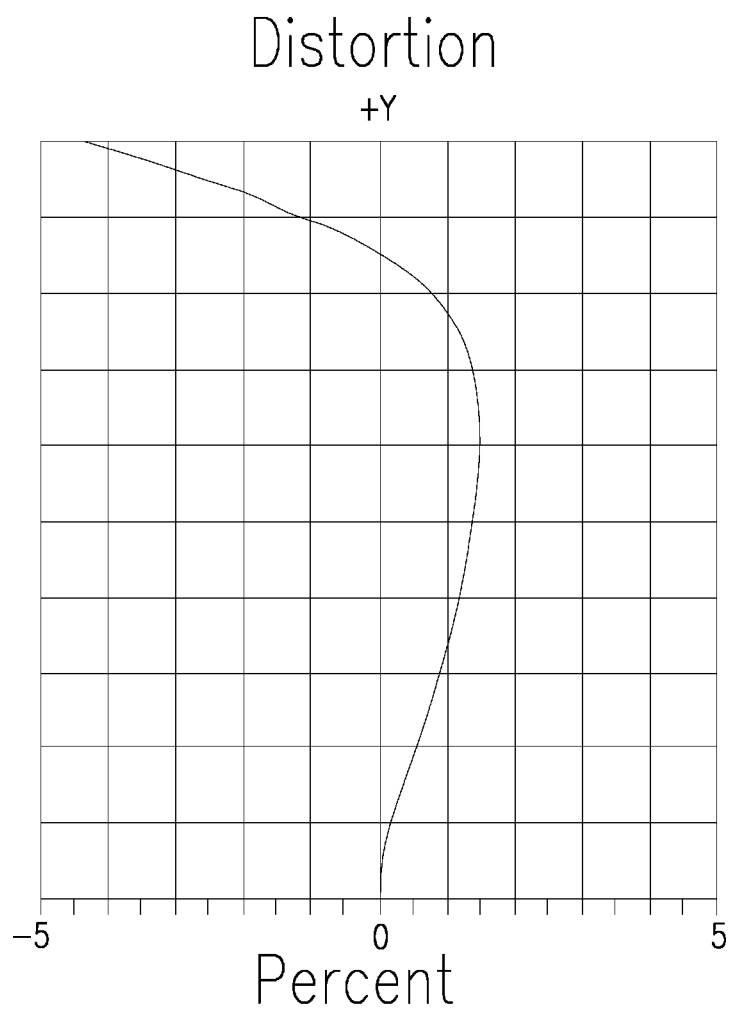
FIG. 3 is a schematic view showing a distorted aberration of the preferred embodiment of the present invention.
Figure 4:
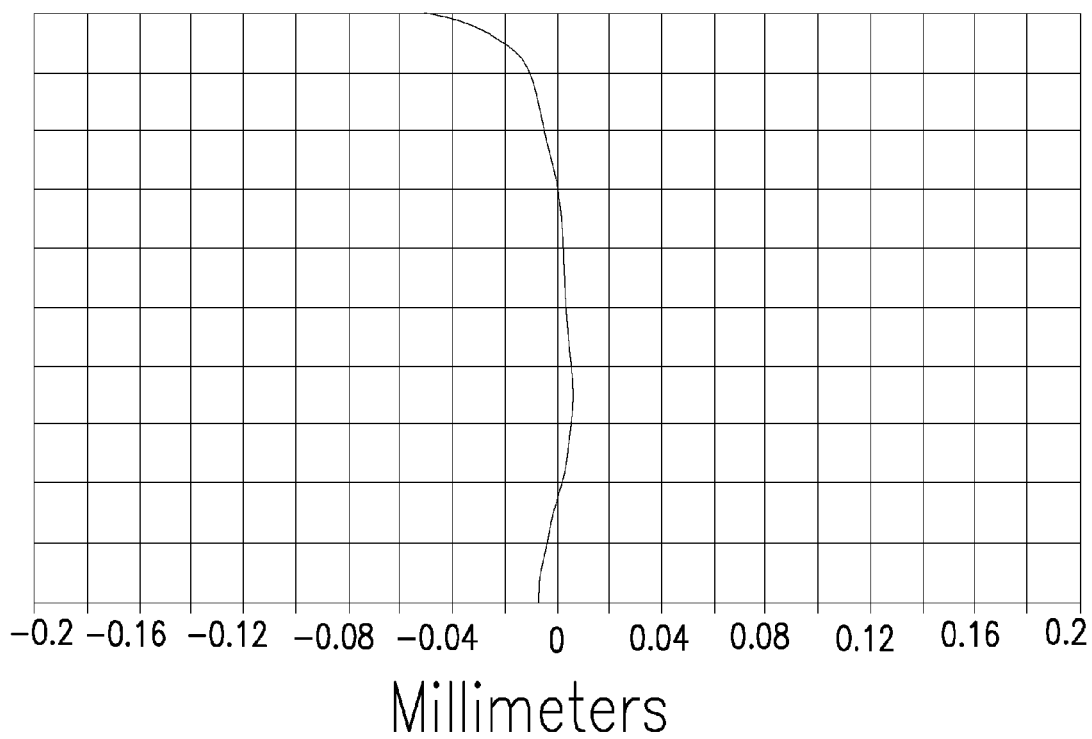
FIG. 4 is a schematic view showing a spherical aberration of the preferred embodiment of the present invention.

Referring to FIG. 2, a schematic view of an astigmatic aberration of the preferred embodiment of the present invention is shown. Referring to FIG. 3, a schematic view of a distorted aberration of the preferred embodiment of the present invention is shown. Referring to FIG. 4, a schematic view of a spherical aberration of the preferred embodiment of the present invention is shown. The measured astigmatic aberration, distorted aberration, and spherical aberration are in the standard scope and have a good optical performance and imaging quality according to the above-mentioned figures.

The micro-optical image capturing device utilizes four aspheric lenses with refractive power sequentially arranged as positive, negative, positive, and negative, and the filter unit 60 which filters a light with infrared wave length and allows the light with the required wave length. The filter unit 60 is preferably adopted by an infrared stopping filter unit used for the visible light image.

By making use of the aspheric surface that corrects the aberration and reduces the common difference sensitivity, not only the aberration is corrected but also the full length of the lens optical system is reduced. Further, the device provides with a ultra-wide-angle with an image capturing angle over 85°. The first, second, third, and fourth, lenses are preferably adopted by plastic, which is conducive to eliminate the aberration and reduce the weight of the lens. The optical system consists of four plastic lenses and provides with the low common difference sensitivity. The optical system is also easy to be manufactured and assembled and benefits a mass production. Furthermore, the optical system provides with a fine imaging quality to meet the requirement of miniaturizing the portable image capturing products.

While we have shown and described the embodiment in accordance with the present invention, it should be clear to those skilled in the art that further embodiments may be made without departing from the scope of the present invention.

I claim:

1. An imaging lens assembly comprising:
a fixing diaphragm and an optical set;
said optical set including a first lens, a second lens, a third lens, and a fourth lens, an arranging order thereof from an object side to an image side being:
said first lens having a positive refractive power and a convex surface directed toward said image side;
at least one surface of said first lens being aspheric;
said second lens having a negative refractive power and a convex surface directed toward said image side;
at least one surface of said second lens being aspheric;
said third lens having a lens with a positive refractive power and a convex surface directed toward said image side;
two surfaces of said third lens being aspheric and having at least one inflection point defined from an optical axis to an end point of said aspheric surfaces;
said fourth lens having a negative refractive power, a convex surface directed toward said object side and disposed near an optical axis, and a concave surface directed toward said image side and disposed near said optical axis;
said two surfaces being aspheric and having at least one inflection point from said optical axis to an end point of said aspheric surfaces;
said fixing diaphragm being disposed between an object and said second lens;
said imaging lens assembly satisfying the following conditional expression: 0.3<f/TL<0.8, wherein said TL is defined as a distance from a top point of said object side of said first lens to an imaging surface side, said f is a focal length of said entire assembly;
said imaging lens assembly satisfying the following conditional expression: 0.6<TL/Dg<1.2, wherein said TL is defined as said distance from said top point of said object side of said first lens to said imaging surface side, said Dg is defined as a length diagonal of an effective pixel area of an electronic sensitization unit;
said imaging lens assembly satisfying the following conditional expression: 0 mm<TL≤3.41 mm; and
said imaging lens assembly satisfying the following conditional expression: 76°<FOV≤100°, wherein said FOV is defined as the field of view of said entire assembly.

2. The imaging lens assembly as claimed in claim 1, wherein a shape of said aspheric surface satisfies a formula of:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein said z is defined as a position value about a location at a height of h along a direction of said optical axis referring to a surface top point, said k is defined as a conic constant, said c is defined as a reciprocal of a radius of a curvature, and said A, B, C, D, E, G, etc. are defined as high-order aspheric surface coefficients.

* * * * *